United States Patent Office
2,895,947
Patented July 21, 1959

2,895,947
POLYMERIZATION OF DI-(2,3-EPOXYPROPYL PHTHALATE)

Edward C. Shokal, Walnut Creek, and Albert C. Mueller, Berkeley, Calif., assignors to Shell Development Company, Emeryville, Calif., a corporation of Delaware No Drawing. Application February 11, 1954
Serial No. 409,782

2 Claims. (Cl. 260—78.4)

This invention relates to a new class of epoxy-substituted organic compounds and to their preparation. More particularly, the invention relates to new epoxy esters, to their preparation and to the utilization of the esters, particularly as stabilizers and plasticizers and as monomers for the preparation of improved polymeric products.

Specifically, the invention provides new and particularly useful polyepoxide polyesters comprising esters of epoxy-substituted monohydric alcohols and acid components of the group consisting of aromatic polycarboxylic acids and acid esters of these acids and polyhydric compounds wherein at least two of the carboxyl groups of the said acid components are esterified with the epoxy alcohol. The invention further provides polymeric products obtained by polymerizing the above-described polyepoxide polyesters by themselves or with other types of epoxy-substituted compounds.

It is an object of the invention to provide a new class of epoxy-substituted organic compounds. It is a further object to provide certain novel epoxy esters of aromatic polycarboxylic acids, and to a method for their preparation. It is a further object to provide new polyepoxide polyesters which are particularly useful and valuable in the chemical and related industries. It is a further object to provide epoxy esters of aromatic polycarboxylic acids which are valuable as stabilizers and plasticizers for vinyl halide polymers. It is a further object to provide epoxy esters of aromatic polycarboxylic acids which are valuable as lubricants and crease- and shrink-proofing agents for textile fabrics. It is a further object to provide novel epoxy-substituted esters that may be polymerized to form polymers having valuable properties. Other objects and advantages of the invention will be apparent from the following detailed description thereof.

It has now been discovered that these and other objects may be accomplished in part by the novel compounds of the invention comprising esters of epoxy-substituted monohydric alcohols and acid components of the group consisting of aromatic polycarboxylic acids and acid esters of the aromatic polycarboxylic acids and polyhydric compounds, wherein at least two of the carboxyl groups of the said acid components are esterified with the epoxy alcohol. It has been found that these particular esters possess unobvious beneficial properties which make them particularly adapted for many important commercial applications. These novel esters are, for example, good stabilizers for halogen-containing polymers, such as polymers of vinyl chloride, and endow the resulting compositions with improved resistance to decomposition by heat and light. The novel esters are also valuable in the role of a plasticizer and softening agent for vinyl polymers and synthetic rubbers. When added to the halogen-containing polymers, the novel esters may act both as a plasticizing agent and as a stabilizing agent. The above-described esters also act as lubricants and softening agents for textiles and when cured within the fibers of the fabrics tend to impart improved crease- and shrink-resistance to the fabrics.

It has also been found that when the above-described novel esters are treated with certain catalytic materials, such as primary and secondary amines, they are polymerized through the epoxy linkage to form cross-linked polymers having many valuable properties. They may be polymerized in this manner by themselves or with other polyepoxide materials. As indicated hereinafter, particularly valuable products are obtained by polymerizing the novel esters with polyepoxide polyethers obtained by reacting polyhydric phenols with epichlorohydrin.

The epoxy-substituted alcohols, the novel esters of which are provided by the present invention, comprise those monohydric alcohols possessing at least one epoxy group, i.e., a

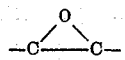

group. These alcohols may be aliphatic, cycloaliphatic, aromatic or heterocyclic and may be saturated or unsaturated and substituted with non-interfering substituents, such as halogen atoms. Examples of these alcohols include 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propanol, 2,3-dimethyl - 4,5 - epoxyoctanol, 2-methoxy-4,5-epoxyoctanol, 3,4 - epoxy-5-chlorocyclohexanol, 2,3-epoxypropoxypropanol, 2,3-epoxypropoxyhexanol, 2,3-epoxypropoxy-2,3-dihydroxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl-2,3-epoxypropanol, 2,3-epoxycyclohexanol, 2,3-epoxypropoxyethanol, 2,3-epoxypropoxyoctanol, and the like.

Particularly preferred epoxy-substituted alcohols are the epoxyalkanols, epoxyalkoxyalkanol, epoxyalkenols, epoxyalkoxyalkenols, epoxycycloalkanols and epoxyalkoxyalkanols, epoxycycloalkenols and epoxyalkoxyalkenols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octenol, 3,4-epoxycyclohexanol, 2,3 - epoxypropoxy - 4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their esters as well as the superior properties possessed by such esters.

The aromatic polycarboxylic acids, esters of which are provided by the present invention, comprise the aromatic polycarboxylic acids which are, in most cases, normally solid and have relatively high melting points, e.g., melting points above about 125° C. These acids have two or more, and preferably 2 to 4, carboxyl groups which are directly attached to an aromatic nucleus. Examples of these acids include, among others, isophthalic acid, terephthalic acid, orthophthalic acid, diphenyl-4,4'-dicarboxylic acid, stilbene dicarboxylic acid, 3,6-dichlorophthalic acid, tetrachlorophthalic acid, 2,7-naphthalene dicarboxylic acid, diphenylthioether-4,4'-dicarboxylic acid HOOCC$_6$H$_4$SC$_6$H$_4$COOH, diphenoxybenzene-4,4'-dicarboxylic acid HOOCC$_6$H$_4$OC$_6$H$_4$OC$_6$H$_4$COOH, dicarboxydiphenylmethane, dicarboxyphenyltolylmethane, dicarboxyldibenzylbenzene, 2,3-dimethyl-1,4-benzenedicarboxylic acid, 3-ethyl-1,4-benzenedicarboxylic acid, 3-hydroxy-1,4-benzenedicarboxylic acid, 4-butyl-1,3-benzenedicarboxylic acid, and 5-isopropyl-1,4-benzenedicarboxylic acid.

The preferred aromatic polycarboxylic acids are the mononuclear dicarboxylic acids having no more than 15 carbon atoms and the di- and trinuclear dicarboxylic acids having a chain containing separate six-membered rings preferably separated by bivalent aliphatic hydrocarbon radicals and having the two carboxyl groups attached to separate aromatic rings, such as isophthalic acid, terephthalic acid, stilbene dicarboxylic acid, diphenyl-4,4'-dicarboxylic acid, dicarboxydiphenylmethane, dicarboxyldiphenylpropane, dicarboxyphenyltolylmethane, dicarboxydibenzylbenzene, and the like.

Particularly preferred, especially because of the fine properties of the polymers prepared from the epoxy esters, are those aromatic dicarboxylic acids having the carboxyl groups in the 1 and 4 positions, so that the molecule forms a linear chain, such as terephthalic acid, p,p'-stilbene dicarboxylic acid, diphenyl-4,4'-dicarboxylic acid, 4,4'-dicarboxydiphenylmethane, 4,4'-dicarboxydiphenylpropane, and 4,4'-dicarboxydibenzylbenzene.

The acid esters, epoxy esters of which are provided by the present invention, are those obtained by esterifying a polyhydric compound with at least two moles of one of the above-described aromatic polycarboxylic acids so that there are at least two free carboxyl groups left to react with the above-described epoxy alcohols. Polyhydric compounds used for the preparation of the acid esters may be any compound possessing a plurality of esterifiable hydroxyl groups. Such compounds may be aromatic, aliphatic, cycloaliphatic, heterocyclic, saturated or unsaturated and may be substituted or unsubstituted with non-interfering substituents, such as chlorine atoms, ether radicals, and the like. Examples of these compounds include, among others, glycerol, 2,2-bis(4 - hydroxyphenyl)propane, 3,4 - bis(4 - hydroxyphenyl)pentane, ethylene glycol, polyglycerol, pentaerythritol, polypentaerythritol, mannitol, sorbitol, cellulose, methyltrimethylolmethane, 1,4,6-octanetriol, butanediol, 1,3,-pentanediol, 1,4-hexanediol, 2,8-dodecanediol, 1,8-octanediol, glycerol allyl ether, glycerol monoethyl ether, triethylene glycol, 2-ethylhexanediol, 1,4, sucrose, fructose, maltose, 3,3'-thiodipropanol, 4,4'-sulfonyldipropanol, 4,4'-sulfonyldihexanol, 3,5-dithiahexanediol-1,6, i.e., $HO(CH_2)_2SCH_2SHC_2OH$, 3,6-dithiaoctanediol-1,8, cyclohexanediol-1,4, 1,2,6-hexanetriol, 1,3,5-hexanetriol, polyallyl alcohol, polyvinyl alcohol, 1,3-bis(2-hydroxyethoxy)propane, 5,5'-dihydroxydiamyl ether, tetrahydrofuran-2,5-dipropanol, tetrahydrofuran-2,5-dipentanol, 2,5-dihydroxytetrahydrofuran, tetrahydrothiophene - 2,5 - dipropanol, tetrahydropyrrole - 2,5-dipropanol, 4-hydroxy-3-hydroxytetrahydropyran, 2,5-dihydroxy - 3,4 - dihydro - 1,2 - pyran, 4,4' - sulfinyldipropanol, and the like.

Other examples of polyols include those obtained by reacting polyhydric phenols with epichlorohydrin to form products of the type

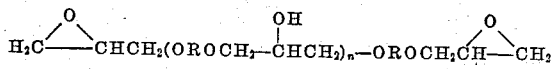

wherein R is a bivalent radical derived from the polyhydric phenol and $n$ is an integer greater than one. Suitable polyols may also be derived from polyepoxides, such as above, and others by opening the epoxide group by hydrolysis, reaction with amines, etc.

Preferred acid esters are those derived from the above-described aromatic polycarboxylic acids and polyhydric compounds comprising the aliphatic polyhydric alcohols possessing from 2 to 6 esterifiable hydroxyl groups and containing no more than 20 carbon atoms. Examples of these preferred polyols include, among others, polyallyl alcohol containing up to 6 units of allyl alcohol, glycerol, glycerol alpha-allyl ether, 1,2,6-hexanetriol, pentaerythritol, sucrose, 2,5-pentanediol, 3-methyl-2,4-hexanediol, triethylene glycol, 4,4'-thiodihexanol, 3,3'-sulfonyldipropanol, and the like.

Coming under special consideration, particularly because of the fine properties of their resulting epoxy esters as plasticizers, are the acid esters of the aromatic polycarboxylic acids and polyols having at least one oxygen, sulfur, sulfinyl or sulfonyl group in the alcohol molecule, such as, for example, 3,3'-thiodipropanol, 4,4'-sulfinyldipentanol, polyethylene glycols, di(hydroxyalkyl) ethers, the di(hydroxyalkoxyalkyl) ethers, tetrahydrofuran - 2,5 - dipropanol, 2,5 - dihydroxy - 3,4 - dihydropyran, and the like.

The above-described acid esters may be obtained by any suitable method, but are preferably obtained by heating the polyhydric compound with at least a double molar quantity of aromatic polycarboxylic acid in the presence of a catalyst and removing the water formed during the reaction. Catalysts utilized for this reaction may be exemplified by p-toluenesulfonic acid, ethylsulfonic acid, hydrobromic acid, chloroacetic acid, sulfuric acid, boron and silicon fluorides, acid salts, as monosodium sulfate, and salts of strong acids and weak bases, such as aluminum sulfate, zinc sulfate, and the like. The amount of the catalyst employed will vary over a wide range but, in most cases, may vary from 0.1% to 5% by weight of the reactants.

The esterification may be accomplished in the presence or absence of solvents or diluents. In case solvents or diluents are employed, organic compounds, such as benzene, toluene, cyclohexane, xylene, and mixtures thereof, are generally preferred. The temperature employed during the esterification generally varies from about 80° C. to 150° C. The water formed during the process may be removed by any suitable method, but is preferably removed by azeotropic distillation with a diluent, such as xylene or toluene. The acid ester may be removed from the reaction mixture by suitable methods, such as fractional distillation, extraction, and the like.

The novel epoxy esters of the present invention are the esters of any one or more of the above-described epoxy monohydric alcohols with any one of the above-described aromatic polycarboxylic acids or acid esters. These esters may be exemplified by the following: di(2,3-epoxypropyl) terephthalate, di(2,3-epoxypropyl) isophthalate, di(2,3-epoxypropyl) orthophthalate, di(3,4-epoxybutyl) terephthalate, di(3,4-epoxypentyl) chlorophthalate, di(epoxypropoxypropyl) terephthalate, di(2,3-epoxypropyl) p,p'-stilbene dicarboxylate, di(2,3-epoxypropyl) o,m'-stilbene dicarboxylate, di(3,4-epoxyhexyl) 4-butylphthalate, di(carboepoxypropoxy)dibenzyldibenzene

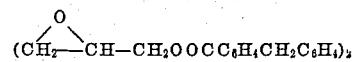

di(carboepoxypropoxy) diphenylmethane, di(carboepoxypropoxy)phenyltolylmethane, di(3,4-epoxyhexyl)diphenylthioether-4,4'-dicarboxylate, di(2,3-epoxypropyl) diphenoxybenzene-4,4'-dicarboxylate, 1,5-pentanediol bis-(2,3-epoxypropyl phthalate), 1,6-hexanediol bis(2,3-epoxypropyl terephthalate), diethylene glycol bis(2,3-epoxyhexyl isophthalate), glycerol tri(2,3-epoxyhexyl chlorophthalate), tetrahydropyran-2,3-dipropanol bis(epoxypropoxyethyl terephthalate), pentaerythritol bis(2,3-epoxyoctyl) terephthalate, 1,5-pentanediol bis(2,3-epoxypropyl stilbene dicarboxylate), 1,5-pentanediol bis(2,3-epoxypropyl diphenoxybenzene-4,4'-dicarboxylate), diethylene glycol bis(2,3-epoxypropyl diphenylthioether-4,4'-dicarboxylate), and bis-phenol bis(2,3-epoxy propyl terephthalate)

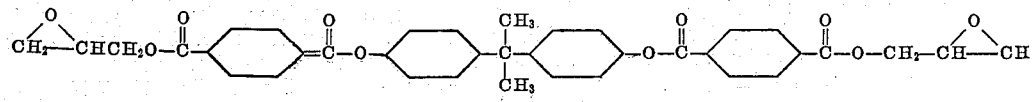

The preferred epoxy esters of the invention are those derived from (1) the preferred aromatic acids and acid esters, i.e., the mononuclear dicarboxylic acids having no more than 15 carbon atoms and di- and trinuclear dicarboxylic acids having a chain containing separate six-membered rings preferably separated by bivalent aliphatic hydrocarbon radicals and having the two carboxyl groups attached to separate aromatic rings, and acid esters of these afore-described acids and aliphatic polyhydric alcohols containing from 2 to 6 esterifiable hydroxyl groups, and (2) the preferred epoxy-substituted aliphatic and cycloaliphatic monohydric alcohols containing from 3 to 15 carbon atoms, such as, for example, di(2,3-epoxypropyl) terephthalate, di(2,3-epoxypropyl) chloroterephthalate, di(3,4-epoxyhexyl) isophthalate, di(3,4-epoxycyclohexyl) orthophthalate, di(epoxypropoxyethyl) 2-methylterephthalate, di(3,4-epoxycyclohexyl) p,p'-stilbene dicarboxylate, di(epoxypropoxyethyl) m,p'-stilbene dicarboxylate, 1,5-pentanediol bis(2,3-epoxypropyl) terephthalate), diethylene glycol bis(2,3-epoxyoctyl) chlorophthalate), 1,5-pentanediol bis(3,4-epoxyhexyl p,p'-stilbene dicarboxylate), and pentaerythritol bis(2,3-epoxypropyl terephthalate).

The novel esters of the invention may be prepared by a variety of different methods. They may be prepared, for example, by reacting the epoxy-substituted alcohol with an acid halide of the aromatic polycarboxylic acid or the acid ester, under anhydrous conditions and removing the hydrogen halide formed during the reaction. They may also be prepared by reacting a sodium salt of the aromatic polycarboxylic acid or acid ester with a halo-substituted epoxy compound corresponding to the desired epoxy alcohol. The novel esters may also be obtained by epoxidizing an ester of an unsaturated alcohol corresponding to the desired epoxy alcohol, and the aromatic polycarboxylic acid or acid ester, with peroxidizing agents, such as perbenzoic acid.

The novel esters, however, are preferably prepared by reacting the aromatic polycarboxylic acid or acid ester with a halo-substituted epoxy compound, which corresponds to the desired alcohol, such as epichlorohydrin, so as to form the halohydrin ester and then dehydrohalogenating the halohydrin to form the epoxy ester. The formation of the halohydrin ester is preferably accomplished by merely mixing the aromatic polycarboxylic acid or acid ester with the halo-substituted epoxy compound and heating the mixture to effect the reaction. The acid or acid ester is combined with at least a chemical equivalent amount of the halo-substituted epoxy compound and more preferably, with from 1.2 to 3 equivalents of the halo-substituted epoxy compound. As used herein in reference to the amount of epoxy compound and acid or acid ester, the expression "chemical equivalent amount" refers to that amount of halo-substituted epoxy compound needed to furnish one hydroxyl group for every carboxyl group to be esterified.

The reaction between the acid or acid ester and the halo-substituted epoxy compound may be effected in the presence or absence of catalyst. Suitable catalysts include the tertiary amines, such as triethylamine, tributylamine, triphenylamine, and the like. Weak tertiary amines, e.g., amines that in aqueous solution give a pH less than 10, are particularly preferred. The amount of the catalyst employed will generally vary from about .01% to 5% by weight of the reactants, and more preferably from about .01% to 3% by weight of the reactants.

Diluents or solvents may be employed as desired or needed to effect the solution or dilution. Suitable components of this type include, among others, inert liquid hydrocarbons, such as benzene, toluene, cyclohexane, and the like.

The temperature employed in the process may vary over a considerable range. The temperature should be at least sufficiently high to effect the reaction, but should not be above the decomposition temperature of the reactants. As a general proposition, temperatures ranging from about 50° C. to 150° C. are suitable, with temperatures ranging from about 60° C. to 125° C. being more preferred. For the preparation of esters using epichlorohydrin, it is generally preferred to maintain the mixture at the boiling temperature, which, in most cases, ranges from about 100° C. to about 140° C. Atmospheric, superatmospheric or subatmospheric pressures may be used as desired.

The catalyst and any excess halo-substituted epoxy compound are preferably removed from the halohydrin ester, such as by distillation under reduced pressure or by extraction, before the halohydrin is dehydrohalogenated to form the epoxy ester.

The halohydrin ester produced by the above process is then treated with a dehydrohalogenating agent to form the desired epoxy ester. Any of the known dehydrohalogenating materials may be used for this reaction, such as sodium and potassium hydroxide, sodium and potassium carbonates, and bicarbonates, borax, hydroxides of magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media.

The amount of the dehydrohalogenation agent used may vary over a considerable range. If all of the

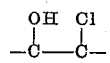

groups are to be converted to epoxy groups, the halohydrin should be reacted with an amount of the alkaline dehydrohalogenating agent which is at least equivalent to the hydrogen halide content of the halohydrin ester. Thus, for the preparation of di(2,3-epoxypropyl) terephthalate, one should react with the di(chlorohydroxypropyl) terephthalate with alkaline material in a mole ratio of at least 1:2.

In most cases, the alkaline material may be applied to the halohydrin ester in an aqueous solution or suspension or dissolved in an inert solvent, such as ether, esters, hydrocarbons, and the like. If the above-noted aluminates, silicates, or zincates are used as the alkaline material, the dehydrohalogenation is preferably affected in a non-aqueous medium.

In most cases, the dehydrohalogenation reaction is initiated on contact of the reactants at room temperature. The reaction is exothermic and sufficient heat is usually liberated to permit one to conduct the reaction at the desired temperature without resort to the use of external heating means. In some cases, it may be desirable to cool the reaction mixture during the contacting of the reactants. If the reaction is conducted in the presence of water, it is generally preferred to maintain the temperature below about 50° C. to prevent hydrolysis of the ester and epoxide groups. If the reaction is conducted in a substantially non-aqueous medium and in the presence of hydroxides, such as sodium hydroxide, temperatures may be employed so as to remove the water formed in the reaction by azeotropic distillation with diluents, such as xylene, toluene, and the like.

At the end of the reaction, the reaction mixture is filtered through a suitable filtering medium, e.g., diatomaceous earth to remove the alkali metal halides and any excess catalyst. The distillate is then treated to recover the epoxy ester. If the reaction has been conducted in the presence of water, care should be taken to avoid hydrolysis of the epoxide groups during the separation process. This may be accomplished by various extraction or distillation methods using subatmospheric pressures and conditions unfavorable to hydrolysis of the epoxide groups. Separation may be conveniently effected by treating the aqueous reaction mixture in a continuous extraction apparatus wherein any suitable extractant such as an alcohol, ether, etc., may be utilized. The extracted epoxide may be separated from its solution with the extractant by subjecting the preferably anhydrous solution to distillation or fractionation operation.

In the case where the reaction has been conducted in the absence of water, but in the presence of solvents, the epoxide may be recovered by any suitable method, such as distillation, extraction, and the like. If no solvents or diluents are employed, the epoxide may be recovered and purified by convenient methods, such as distillation under reduced pressure, extraction, fractional precipitation, and the like.

The novel esters of the invention are relatively high-boiling liquids to semi-solids. They are soluble in a great many oils and solvents and are compatible with many synthetic polymers and resin. The esters are particularly valuable as additives for vinyl polymers as they act to plasticize the polymer and form compositions having good flexibility and strength over a wide range of temperature.

The vinyl polymers that may be plasticized with the novel esters of the invention include the homopolymers, copolymers, and interpolymers of the vinyl-type monomer, i.e., those monomers having a $CH_2=C=$ group, such as styrene, alpha-methyl styrene, vinyl naphthalene, vinyl phenol, acrylic acid esters as methyl acrylate, propylacrylate, butyl acrylate, esters of substituted acrylic acid, such as methyl methacrylate, lauryl methacrylate, hexyl methacrylate, vinylidene chloride, vinyl chloride, acrylonitrile, methacrylonitrile, vinyl esters of vinyl acetate, vinyl benzoate, vinyl caproate, diallyl phthalate, diallyl succinate, vinyl ethers, such as vinyl ethyl ether, vinyl butyl ether, the vinyl ketones, vinyl pyridine, and the like.

Particularly preferred materials to be plasticized with the novel esters are the halogen-containing polymers and copolymers, and particularly the homopolymer of the vinyl halides and copolymers of the vinyl halides with dissimilar monomers as the unsaturated esters.

A single novel ester may be used as the plasticizer or a mixture of two or more of the compounds may be utilized. In addition, the esters may be used as plasticizers in combination with other plasticizing materials, such as dioctyl phthalate, dibutyl phthalate, tricresyl phosphate, dibutyl sebacate, and the like.

The amount of the esters to be incorporated with the above-described polymers may vary over a considerable range depending upon the particular type of polymer, intended use of the product, etc. In most cases, the amount of the plasticizer will vary from about 20 to 150 parts by weight per 100 parts by weight of resin. A more preferred range of plasticizer comprises 40 parts to 75 parts by weight for every 100 parts by weight of resins.

The polymer and ester may be compounded by means of conventional equipment such as mills of the heated roll-type of internal mixers. The plasticizer and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by conventional procedure.

The novel esters of the invention may also be used as stabilizing agents for halogen-containing polymers. The esters are easily compatible with these polymers and in combination therewith form compositions which have good resistance to discoloration by heat and/or light. The novel esters may be used as stabilizers by themselves or they may be used in combination with other stabilizing agents, such as urea and thiourea derivatives, metal salts or organic and inorganic acids, and the like.

In most cases, the esters are effective as stabilizers in amounts varying from about .1% to 5% by weight of the polymer being stabilized, but larger or smaller amounts may be employed as desired or necessary. If other stabilizers are employed in combination with the novel esters, the esters may generally be utilized in smaller quantities, such as from about .01% to about 2% by weight of the polymer.

The esters may be incorporated into the halogen-containing polymers by any suitable method. They may be added in a dissolved, suspended or pulverulent state to the desired polymer which, in turn, may be in a dissolved, dispersed or solid stage. In some cases, it may be possible to introduce the novel esters in the reaction mixture during the formation of the halogen-containing polymer. In most cases, however, it will probably be more desirable to add the ester by merely mixing the polymer and ester in a masticator or on heated differential rolls.

As noted above, the novel esters also act as plasticizing materials for these halogen-containing polymers so with these polymers, it is possible to utilize the esters as combined stabilizer-plasticizers. In this case, the esters will be added in amounts and in the manner described hereinabove for the use of the esters as plasticizers and in that case the resulting composition will display the desired improvement in flexibility as well as increased resistance to heat and light.

The polyepoxides of the present invention are particularly useful in the preparation of valuable polymeric products. They may react with hydroxy containing materials, such as hydroxy containing polyesters, to form block copolymers, or they may be polymerized by themselves or with other types of epoxy-containing materials. Materials of this latter type that may be copolymerized with the claimed polyepoxides include, among other, ethylene oxide, propylene oxide, isobutylene epoxide, epichlorohydrin, vinyl cyclohexane dioxide, butadiene mono- or dioxide, epoxidized tri- and diglycerides, epoxy-ethers, such as diglycidyl ether and glycidyl ethers of polyhydric phenols obtained by reacting a polyhydric phenol, such as bis-phenol with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, pentaerythritol, polyglycerol, and the like, and subsequently treating the resulting product with an alkaline component to replace the epoxy group, and other polyepoxide esters, such as di(2,3-epoxypropyl) adipate, and the like. The glycidyl polyethers of polyhydric phenols obtained by condensing polyhydric phenols with epichlorohydrin are also referred to as "ethoxyline" resins. See Chemical Week, vol. 69, page 27, for September 8, 1951.

The polymerization of the novel epoxy-substituted esters is preferably accomplished by heating the materials in the presence of an epoxy curing catalyst, such as an amine as triethylamine, ethylenediamine, 2,4,6-tris(dimethylaminomethyl)phenol, melamine; acids and anhydrides, such as phthalic anhydride, and $BF_3$ and its ether complexes. Amounts of catalyst employed preferably vary from .1% to 15% by weight of the monomer. Temperatures used for the polymerization generally vary from about 40° C. to about 100° C.

The polymers prepared from the novel epoxy esters by themselves or with other types of polyepoxide materials are useful in the preparation of coating and impregnating compositions, additives for lubricating oils as viscosity index improvers and pour point depressants, and in the formation of pottings and castings for electrical apparatus and in the formation of rigid plastic articles.

To illustrate the manner in which the invention may be carried out, the following examples are given. It is to be understood, however, that the examples are for the purpose of illustration and the invention is not to be

Example I

This example illustrates the preparation and properties of di(2,3-epoxypropyl) orthophthalate.

About 83 parts of phthalic acid was mixed with 500 parts of epichlorohydrin and 1 part of tributylamine and the mixture heated to reflux. After 1 hour, the acidity of the mixture dropped to zero and the mixture was then distilled to remove the excess epichlorohydrin. The bottoms product, which was made up substantially of the chlorohydrin phthalate ester, was a fluid yellow liquid.

184 parts of bottoms product was dissolved in 500 parts of $CH_2Cl_2$ and the mixture heated to reflux. 32 parts of sodium hydroxide in the form of small pellets was slowly added to the mixture. The water formed during the reaction was removed by azeotropic distillation with the methylene dichloride. After 20 hours, the mixture was filtered and the filtrate distilled under vacuum. The residue was a thick light-colored liquid identified as di(2,3-epoxypropyl) phthalate.

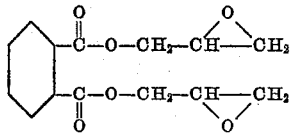

Ester value: 0.64 eq./100 g. Epoxy value: 0.45 eq./100 g.

The above epoxy ester finds use as a combined plasticizer-stabilizer for poly(vinyl chloride) and copolymers of vinyl chloride and vinyl acetate.

When 100 parts of the di(2,3-epoxypropyl) phthalate produced above is mixed with 5 parts of 2,4,6-tris(dimethylaminomethyl)phenol and the mixture heated at 65° C., the mixture set up into a very hard solid polymer.

Example II

This example illustrates the preparation and some of the properties of di(2,3-epoxypropyl) terephthalate.

About 83 parts of terephthalic acid was mixed with 500 parts of epichlorohydrin and 1 part of tributylamine and the mixture heated to reflux. After several hours, the acidity of the mixture dropped to zero and the mixture was then distilled. The bottoms product, which was made up substantially of the chlorohydrin terephthalate ester, was a fluid yellow liquid.

172 parts of bottoms product was dissolved in 500 parts of $CH_2Cl_2$ and the mixture heated to reflux. 32 parts of sodium hydroxide in the form of small pellets was slowly added to the mixture. The water formed during the reaction was removed by azeotropic distillation with the methylene dichloride. After several hours, the mixture was filtered and the filtrate distilled under vacuum. The residue was a thick light-colored liquid identified as di(2,3-epoxypropyl) terephthalate:

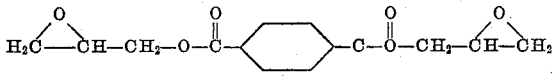

About 100 parts of the di(2,3-epoxypropyl) terephthalate produced above was mixed with 5 parts of 2,4,6-tris(dimethylaminomethyl)phenol and the mixture heated at 65° C. After several hours, the mixture set up into a hard solid polymer.

Example III

About 83 parts of phthalic acid was mixed with 500 parts of 2,3-epoxypropoxyethanol (glycidyl ether of ethylene glycol) and 1 part of tributylamine and the mixture heated to reflux. After several hours, the acidity of the mixture dropped to zero and the mixture was then distilled. The bottoms product was identified as di(hydroxychloropropoxyethyl) phthalate.

170 parts of the di(hydroxychloropropoxyethyl) phthalate is dissolved in 500 parts of $CH_2Cl_2$ and the mixture heated to reflux. 40 parts of sodium hydroxide in the form of small pellets was slowly added to the mixture. The water formed during the reaction was removed by azeotropic distillation with the methylene dichloride. After several hours, the mixture is filtered and the filtrate distilled under vacuum. The residue is a thick liquid identified as di(epoxypropoxyethyl) phthalate.

The above ester may be used as a combined plasticizer-stabilizer for poly(vinyl chloride) when 100 parts of the di(epoxypropoxyethyl) phthalate produced above is mixed with 100 parts of diglycidyl ether of bis-phenol and 5 parts of 2,4,6-tris(dimethylaminomethyl)phenol and the mixture heated at 65° C., the mixture sets to form a hard solid casting.

Esters having related properties may be obtained by replacing the phthalic acid in the above-described process with equivalent amounts of each of the following acids: terephthalic acid, isophthalic acid and dicarboxydibenzylmethane.

Example IV

This example illustrates the preparaiton and some of the properties of di(2,3-epoxypropyl) stilbene dicarboxylate.

About 134 parts (.5 mole) of p,p'-stilbene dicarboxylic acid is mixed with 500 parts of epichlorohydrin and 1 part of tributylamine and the mixture heated to reflux. After several hours, the acidity of the mixture drops to zero and the mixture is distilled to remove the excess epichlorohydrin. The bottoms product is identified as di(hydroxychloropropyl) p,p'-stilbene dicarboxylate.

220 parts of the bottoms product is dissolved in 500 parts of $CH_2Cl_2$ and the mixture heated to reflux. 40 parts of sodium hydroxide in the form of small pellets is slowly added to the mixture. The water formed during the reaction is removed by azeotropic distillation with the methylene dichloride. After several hours, the mixture is filtered and the filtrate distilled under vacuum. The residue is identified as di(2,3-epoxypropyl) p,p'-stilbene dicarboxylate:

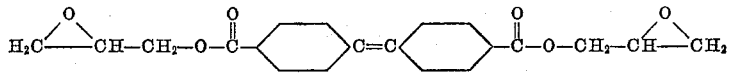

About 100 parts of the di(2,3-epoxypropyl) p,p'-stilbene dicarboxylate is mixed with 50 parts of diglycidyl bis-phenol and 5 parts of 2,4,6-tris(dimethylaminomethyl) phenol and the mixture heated at 65° C. After several hours, the mixture sets up to a hard flexible solid.

Example V

This example illustrates the preparation and some of the properties of pentanediol-1,5 bis(2,3-epoxypropyl phthalate).

Pentanediol-1,5 bis(hydrogen phthalate) is prepared by heating at 150° C. 104 parts (1 mole) of pentanediol-1,5 with 296 parts (2 moles) of phthalic anhydride in 300 parts of toluene in the presence of 3 parts of p-toluenesulfonic acid and removing the theoretical amount of water of esterification by azeotropic distillation with the toluene. Distillation under reduced pressure to remove the toluene yields the acid ester.

About 200 parts of the acid ester is mixed with 500 parts of epichlorohydrin and 1 part of tributylamine and the mixture heated to reflux. When the acidity drops to zero, the mixture is distilled to remove the excess epichlorohydrin. The resulting bottoms product is 1,5-pentanediol bis(hydroxychloropropyl phthalate).

273 parts of the bottoms product is dissolved in 500 parts of $CH_2Cl_2$ and the mixture heated to reflux. 40 parts of sodium hydroxide in the form of small pellets is slowly added to the mixture. The water formed during the reaction is removed by azeotropic distillation with the methylene dichloride. After several hours, the mixture is filtered and the filtrate distilled under vacuum. The residue is identified as pentanediol-1,5 bis(2,3-epoxypropyl phthalate).

About 100 parts of the pentanediol-1,5 bis(2,3-epoxypropyl phthalate) is mixed with 5 parts of 2,4,6-tris(dimethylaminomethyl)-phenol and the mixture heated at 65° C. After several hours, the mixture sets up into a hard solid polymer.

Esters having related properties can be obtained by replacing the 1,5-pentanediol in the above-described process with equivalent amounts of each of the following: 2,4-dimethyl-4-methoxypentanediol-1,5, 1,6-hexanediol and pentaethylene glycol.

We claim as our invention:

1. A method of polymerizing which comprises heating a mixture consisting of di(2,3-epoxypropyl) phthalate and about 0.1% to 15% of a tertiary amine at about 40° C. to about 100° C.

2. The method of claim 1 wherein the amine is 2,4,6-tris(dimethylaminoethyl) phenol.

References Cited in the file of this patent
UNITED STATES PATENTS

| | | |
|---|---|---|
| 2,448,602 | Kester et al. | Sept. 7, 1948 |
| 2,476,922 | Shokal et al. | July 19, 1949 |
| 2,671,064 | Cowell et al. | Mar. 2, 1954 |
| 2,680,109 | Stevens et al. | June 1, 1954 |
| 2,750,395 | Phillips et al. | June 12, 1956 |
| 2,781,333 | Updegraff | Feb. 12, 1957 |
| 2,801,229 | De Hoff et al. | July 30, 1957 |
| 2,801,232 | Suen et al. | July 30, 1957 |

FOREIGN PATENTS

| | | |
|---|---|---|
| 518,057 | Great Britain | Feb. 15, 1940 |

OTHER REFERENCES

Rouse: Official Digest, November 1953, page 825. (Copy in Sci. Libr.)